P. PLANTINGA.
VALVE STRUCTURE.
APPLICATION FILED AUG. 17, 1907.

920,178.

Patented May 4, 1909.
3 SHEETS—SHEET 1.

Witnesses:
J.C. Turner
Lena A. Dirlam.

Inventor:
Pierre Plantinga,
by A.E. Merkel
his attorney.

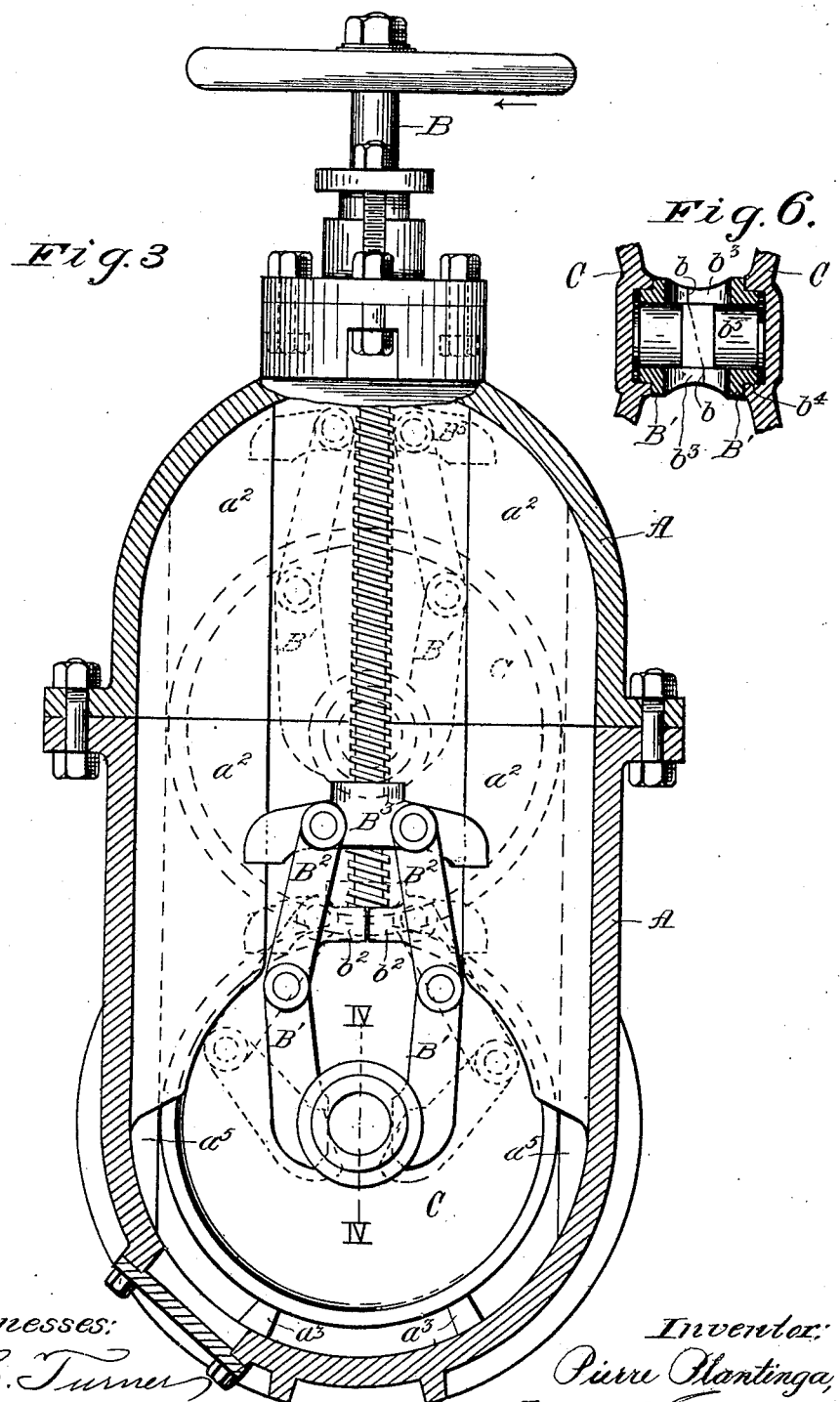

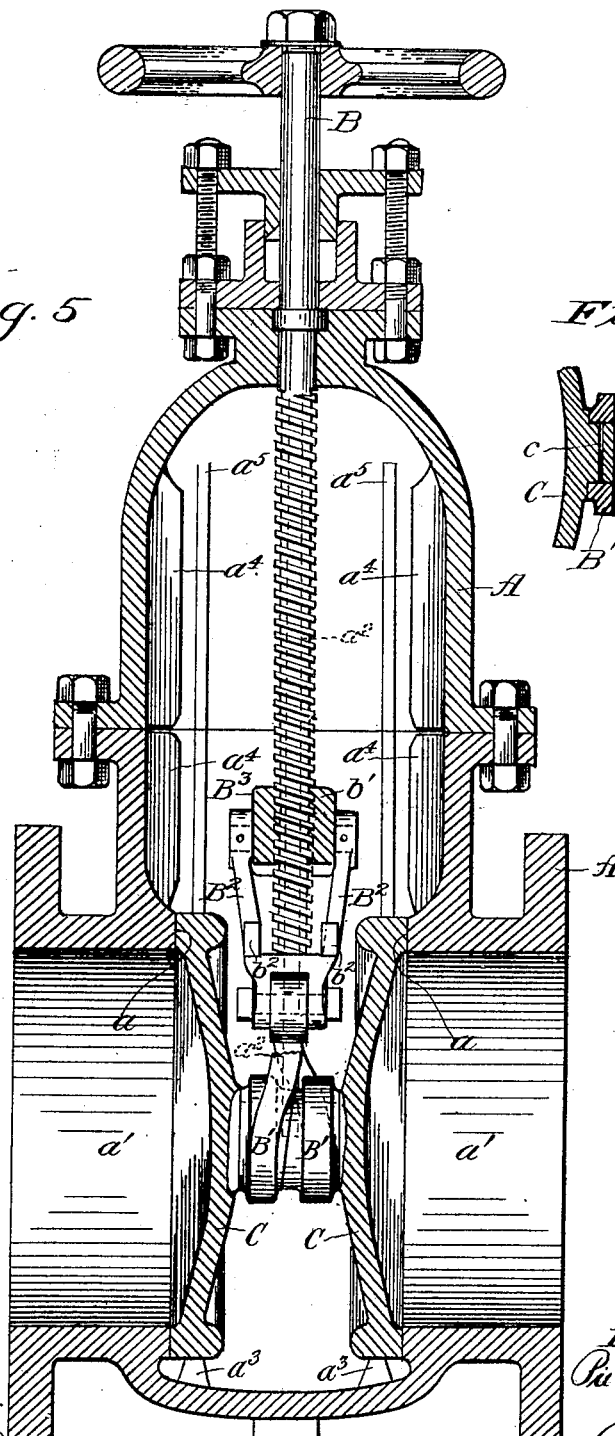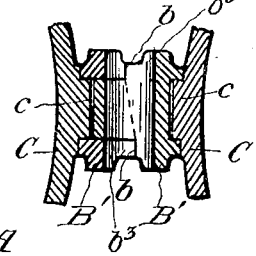

UNITED STATES PATENT OFFICE.

PIERRE PLANTINGA, OF CLEVELAND, OHIO.

VALVE STRUCTURE.

No. 920,178.     Specification of Letters Patent.     Patented May 4, 1909.

Application filed August 17, 1907. Serial No. 389,010.

*To all whom it may concern:*

Be it known that I, PIERRE PLANTINGA, a citizen of the United States, resident of Cleveland, county of Cuyahoga, and State of Ohio, have invented a new and useful Improvement in Valve Structures, of which the following is a specification, the principle of the invention being herein explained and the best mode in which I have contemplated applying that principle, so as to distinguish it from other inventions.

My invention relates to valve structures and particularly to what is known as double-gated gas valves.

The object of my said invention is to provide a structure of the above named class whereby the valve-disks may be readily seated against heavy pressure, and the said invention consists of means hereinafter fully described and particularly set forth in the claims.

The annexed drawings and the following description set forth in detail, certain mechanism embodying the invention, the disclosed means constituting but one of various mechanical forms in which the principle of the invention may be applied.

Figure 2:
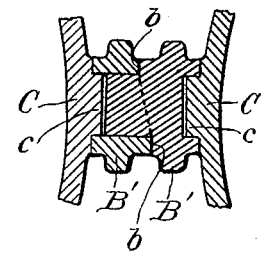
Figure 1:
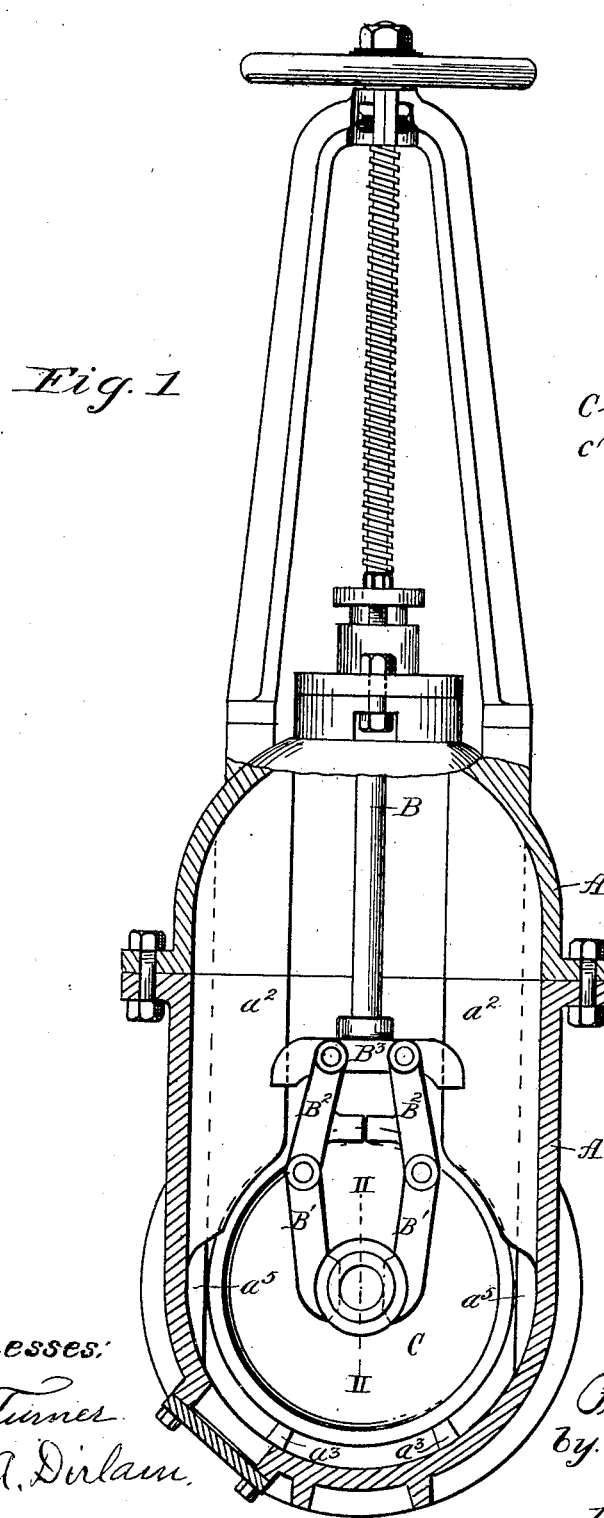

In said annexed drawings:—Figure 1 represents a cross-sectional view of the casing of a double-gated valve embodying my invention, the interior mechanism being shown in elevation, with one of the valve-disks removed to disclose the structure behind it. Fig. 2 represents a detailed section, upon an enlarged scale taken upon the plane indicated by line II—II, Fig. 1, this figure illustrating my invention as particularly applied to an "outside-screw valve." Fig. 3 is a view similar to that of Fig. 1 illustrating my invention as applied to an "inside-screw" valve. Fig. 4 represents a detailed section taken upon the plane indicated by line IV—IV, Fig. 3. Fig. 5 represents a vertical section of the structure illustrated in Fig. 3, showing the interior mechanism in elevation, and taken upon a plane at right angles to that of the plane of section in Fig. 3. In this latter figure the nut for the valve-rod screw is also shown in section. Fig. 6 represents a section taken upon the plane indicated by the line IV—IV, Fig. 3 illustrating a modified form of this part of the structure.

Referring first to the structure shown in Fig. 3, A is the valve-casing into which extends the valve-rod B whose lower end is threaded as shown, and whose upper end is suitably packed in the usual manner. The casing is provided with two valve-seats $a$ $a$ and corresponding openings $a'$ $a'$. Two valve disks C C are provided and are adapted to close the openings $a'$ $a'$ respectively, as will be readily understood. Centrally formed upon the inside surfaces of each valve-disk is a cylindrical journal $c$ $c$ and rotatively mounted upon these journals respectively are two upwardly extending lever-members B' B', Figs. 5 and 6, the valves being conversely rotatable in the bearings formed on the levers. These lever-members are provided with coacting juxtaposed wedge or screw-surfaces $b$ $b$ which are arranged to cause the valve-disks to press against their respective seats when the upper ends of the lever-members are moved downwardly to assume the position shown in dotted lines in Fig. 3. Articulating with the upper ends respectively of these lever members B' are two bifurcated links or arms $B^2$ $B^2$ whose upper ends respectively articulate with a yoke $B^3$. This yoke is formed with a nut portion $b'$, Fig. 5, which receives the threaded end of the valve-rod B. The ends of the yoke $B^3$ are bifurcated, forming grooves which receive webs $a^2$ $a^2$ formed upon the interior of the casing, which webs form guides for the upward movement of the yoke. The parts $B^3$ $B^2$ $B^2$ jointly form a toggle located between the two valve-disks, as shown, capable of actuating the lever members, and which may be caused to travel upwardly or downwardly with the disks, when the valve-rod B is turned, as will be readily understood. The opposing inner faces of the toggle members or links $B^2$ $B^2$ are provided with stops $b^2$ $b^2$ which prevent them from collapsing inwardly. These stops are of a length such that when they are in engagement with each other the width of the middle of the toggle will be substantially equal to the distance between the webs $a^2$ $a^2$. This allows the toggle to freely pass upwardly in the space between these webs, the latter forming guides for the toggle during its upward or downward movement in such space. That part of each of the lever-members B' B' provided with the wedge-surfaces is provided with a semi-circular opening, $b^3$ $b^3$, therethrough and these openings register with each other to form cylindrical openings when the parts are in the position shown in full lines Fig. 3. This opening permits the threaded end of the valve-rod B to pass through these parts when the toggle and valve-disks are raised to the position shown in dotted lines in said figure. The lower ends of the guiding webs $a^2$ $a^2$ are curved as shown in Fig. 3, such curvature being circular, and having a radius substantially equal to the length of the lever-members B' B', whose center lies in the axis of the valve-openings. This curved structure allows the toggle members $B^2$ $B^2$ and levers B' B' to open outwardly into the position shown in dotted lines in Fig. 3, the circular surfaces acting as guides for these parts during the movement. It will therefore be noted that the guiding webs $a^2$ control the operation of the toggle, preventing such operation during a predetermined part of its travel and permitting such operation throughout another predetermined part thereof. The lower part of the interior of the casing is provided with stops $a^3$ $a^3$, Figs. 1, 3 and 5, upon which the disks rest when in apposition to the valve-seats. Additional guiding webs $a^4$ $a^4$ are provided to engage the outer surface of the valve-disks and webs $a^5$ $a^5$ are also provided for engaging the peripheries of the disks and guiding the latter during their upward and downward movement.

Assuming the parts to be in the position shown in Figs. 3 and 5, a turn of the hand-wheel in the direction of the arrow in Fig. 3 will cause the toggle to expand and cause it and levers B' B' to assume the position shown in dotted lines in said figure, its plane of operation being substantially parallel with the plane of the valve seats. This movement causes the valve-surfaces of B' B' to coact to press the valve-disks securely in place upon their seats, thus closing the valve openings. Assuming now that the parts are in the last described position, a turning of the hand-wheel in the opposite direction causes the toggle to move in the opposite direction to re-assume the first mentioned position. This movement allows the valve-disks to recede from their seats, moving in the direction of their axis and permitting the disks to recede from the valve seats. A continued turning of the hand wheel in the last described direction carries the toggle levers and disks upward into the position shown in dotted lines in said Fig. 3, such motion being met with no considerable resistance by reason of the valves' receding movement which preceded it. The introduction of the wedge surface into the structure provides great power which may be exerted by the mechanism and the valves may be therefore closed securely against very heavy pressure exerted upon their exterior faces by fluid under pressure in the valve-openings $a'$ $a'$. This particular adaptation of the structure of the valves while under great pressure, is further accentuated by the fact that the disks are first brought into perfect apposition with the valve-seats and then all of the power applied is applied in the direction of their axis and hence is applied to the very best possible advantage.

When the above described principle is applied to an "outside-valve screw structure" the only modification resides in fixing the lower end of the valve-rod to the yoke. In such described structure the opening from the lower ends of the lever-members B' B' are omitted, as shown in Fig. 2, in all other respects this structure may be made exactly like the above described "inside-screw structure."

Fig. 6 represents a modified form of mounting the lever-members upon the disks in which the said members are provided with a central bore $b^4$ in which is seated a bearing pin $b^5$.

By mounting the valves so as to be rotatable upon the levers, their positions on their seats may be changed from time to time as may be required to correct any small leakages due to imperfect contact, or wear.

I claim—

1. In a valve-structure, the combination of the two valve disks; valve-carrying means for actuating said disks in a direction transverse relatively to the axis of said seat, and including two lever members provided with two coacting wedge-surfaces adapted to actuate said disks in the direction of the axis of the said seat; stopping means for limiting the transverse movement of the disks; said carrying means adapted in conjunction with said stopping means, to actuate said levers.

2. In a valve structure, the combination of the two valve-disks, two lever members centrally engaging said disks and provided with coacting wedge-surfaces, adapted to effect a movement of said disks in the direction of their axis, said disks being rotatably mounted upon said lever members; and means for actuating the latter to effect the engagement of said wedge-surfaces and the consequent movement of the disks.

3. In a valve structure, the combination of the two valve-disks, two lever members centrally mounted upon said disks and provided with coacting wedge-surfaces, two arms articulating with said lever members, means for actuating said arms, and means for controlling such actuation.

4. In a valve-structure, the combination of a valve-rod; a valve-disk; means connecting said rod and disk; and a valve casing provided with a valve opening; said rod adapted to impart to said disk a movement transverse relatively to the axis of said opening; said connecting means adapted when actuated to impart a movement in the direction of said axis and comprising a lever mounted upon said disk and an arm articulating therewith pivotally connected with said rod; said casing provided with a stop for limiting such transverse movement and with means for controlling the actuation of said connecting means.

5. In a valve structure, the combination of two valve disks, means for carrying said disks in a direction transverse relatively to the axes of said seats, said carrying means including two oscillatory levers adapted when oscillated to move said disks toward their respective seats; two arms articulating with the free ends of said levers; a transverse yoke to which the other ends of said arms are pivoted; a screw rod engaging said yoke to raise and lower the same; and guiding means engaging said yoke; such guiding means being arranged to prevent the oscillation of said levers during a predetermined portion of the travel of the carrying means.

6. In a valve structure, the combination of a valve, valve actuating means comprising a valve rod, an oscillatory lever engaging said valve and adapted to move same in the direction of its axis, and an arm connected intermediately of said rod and said lever; and means for controlling the actuation of said arm.

7. In a valve structure, the combination of a valve, valve actuating means comprising a valve rod, an oscillatory lever adapted to actuate said valve in the direction of its axis, and an arm connected with said lever and rod intermediately of same; of a valve casing provided with fixed means controlling the actuation of said arm.

8. In a valve structure, the combination with valve actuating means comprising a valve rod, an oscillatory lever adapted to actuate the valve in the direction of its axis, and an arm connected with said rod and lever and intermediately of same; of a valve casing provided with an inwardly projecting rib engaging said arm and provided with a portion parallel with the direction of movement of the valve rod and a curved portion, such curved portion being concentric with the valve seat in the casing.

9. In a valve structure, the combination with valve actuating means comprising a valve rod, a transverse yoke connected with and movable by said rod in a direction transverse with respect to the axis of the valve, two arms having one end pivotally mounted on said yoke, two oscillatory levers, each having one end articulating with the other end of said arms, two valves respectively mounted upon said levers, the latter adapted when actuated to actuate said valves in the direction of their axes; of a valve casing provided with suitable valve seats and with inwardly projecting ribs, said ribs formed respectively with a portion parallel with the direction of movement of said valve rod and with a curved portion concentric with said valve seats, said ribs adapted to engage the carrying mechanism so as to restrict the oscillation of said levers and the attached arms.

10. In a valve structure, valve actuating means comprising the combination of a valve rod, a transverse yoke having screw threaded engagement with said rod, two arms each pivotally connected with said yoke and upon opposite sides of the axis of said rod, two valve actuating levers pivotally connected with said arms and with said valves, said arms being formed with two grooves together forming an aperture located in the path of movement of said rod relatively to said yoke, whereby said rod may be caused to pass through said aperture when the said mechanism is actuated in the direction of the rod's axis.

Signed by me, this 16th day of August, 1907.

PIERRE PLANTINGA.

Attested by—
CHAS. R. MILLER,
SADIE E. GOTT.